United States Patent [19]

Bates

[11] 4,076,393
[45] Feb. 28, 1978

[54] THERMAL STRESS-RELIEVING COUPLING MEMBER AND SUPPORT

[75] Inventor: Richard L. Bates, San Diego, Calif.

[73] Assignee: The United States of America as represented by the Secretary of the Navy, Washington, D.C.

[21] Appl. No.: 640,517

[22] Filed: Dec. 15, 1975

[51] Int. Cl.² ............................................. G02B 7/00
[52] U.S. Cl. .................... 350/318; 248/478; 248/DIG. 1; 350/253; 428/603; 428/606
[58] Field of Search ............ 350/319, 1, 253, 251, 350/318, 310; 73/334; 248/478, 488, DIG. 1; 29/183

[56] References Cited

U.S. PATENT DOCUMENTS

| | | | |
|---|---|---|---|
| 2,537,900 | 1/1951 | Lee et al. ............................ | 350/253 |
| 2,817,278 | 12/1957 | White et al. ....................... | 350/318 X |
| 2,905,054 | 9/1959 | Logan ................................. | 350/251 |
| 3,671,108 | 6/1972 | Kilgus ................................. | 350/253 |
| 3,956,543 | 5/1976 | Stangeland ........................ | 29/183 X |

*Primary Examiner*—John K. Corbin
*Assistant Examiner*—John D. Lee
*Attorney, Agent, or Firm*—R. S. Sciascia; G. J. Rubens

[57] ABSTRACT

Improved thermal coupling for a fragile member having a low tolerance to mechanical stress is provided by use of thin sheets of common household aluminum foil having impressed thereon a uniform pattern of indentations. The indentations create raised projections which resiliently support the fragile member by the application of a minimum pressure to provide a uniform, non-varying contact therebetween, thereby enabling the mechanical motion therebetween to be absorbed without damage to the fragile member.

7 Claims, 4 Drawing Figures

THERMAL STRESS-RELIEVING COUPLING MEMBER AND SUPPORT

BACKGROUND OF THE INVENTION

Test instrumentation is available for measuring the performance of various types of infrared (IR) detectors and preamplifiers under a variety of infrared photo backgrounds, gamma photon backgrounds, and neutron backgrounds at realistic detector operating parameters. Where a broadband spectral IR source is utilized, it is necessary to employ a suitable filter or dispersive optics, however a single source will produce IR radiation over the entire spectral range. As dispersive optics are complicated and expensive, the use of filters has been prevalent in this specialized art.

It is considered a more desirable option to place the IR source externally, rather than internally, because the problem of calibration is reduced even though the problem of background radiation reduction in the dewar is increased, being the lesser of the two problems. However, background flux can be attenuated by placing a cold optical filter in the optical path especially at cryogenic temperatures, in the order of four degrees Kelvin. Past experience has shown that a dewar operating at liquid cryogen temperature, using liquid nitrogen and helium, can provide realistic operational temperatures for the apparatus.

Each filter, which is usually deposited on a germanium substrate, is supported on an aluminum member which can be a hub to enable it to be rotated in the IR application described above. Adequate thermal coupling of the liquid heat sink to the germanium substrates of the filters is provided so that the entire monochromator and the low-background chamber assembly will be isothermal. The coefficients of thermal expansion of the germanium and the aluminum hub differ by a factor of about three. Therefore, the interface member between the cooled aluminum hub and the germanium substrate must be able to relieve the stress arising from the difference in mechanical motion of these two materials while cooling. The interface member must also simultaneously maintain a thermal coupling between the substrate and the metal hub to allow sufficient short thermal response times. Thus, the interface member must have both thermal and stress-relieving qualities.

Heretofore, the interface member normally used consisted of a thin flat sheet of pure Indium Metal, about 0.010 inch thick. The Indium will flow under pressure to conform to the changing interface dimensions. However, with this arrangement a normal pressure of 50 p.s.i. must be maintained in order for the Indium interface member to be effective.

There are several disadvantages to the use of Indium as an interface member. The higher pressure that must be employed is a disadvantage from the standpoint of a higher probability of stress in the fragile germanium substrate, and requires a more complex constant pressure device. Furthermore, pure Indium is an expensive material. Both disadvantages are overcome by the present invention by using an interface member made of common household aluminum foil on which is impressed a waffled surface capable of resiliently supporting the fragile filter.

SUMMARY OF THE INVENTION

A novel interface member and support is provided for mounting a fragile member, such as an optical filter element, to provide both a non-varying, thermally conductive path between the member and its support, and to absorb any mechanical motion while temperature cycling, resulting from the difference in thermal coefficient of expansion of the optical filter material and the material of the supporting material.

One practical application of the invention is in instrumentation for measuring performance characteristics of IR detectors and preamplifiers under a variety of background radiation conditions.

Use of a fragile optical element is necessary in order to be able to utilize a single broadband spectral IR source, which can produce radiations over the entire spectral range.

The invention comprises an interface member and support for mounting the fragile optical element that is made of common, inexpensive aluminum foil material on which surfaces are impressed a series of indentations, much like a waffle pattern. Such a novel interface member provides greater mechanical resiliency because of its elastic property; enables a much lower changing pressure and simplified design, and being made of common aluminum foil is also much lower in cost.

STATEMENT OF THE OBJECTS OF THE INVENTION

A principal object of this invention is to provide an interface member and support for mounting a fragile member subject to thermal and/or mechanical stress.

Another important object is to provide such an interface member for supporting a fragile optical member that contains good resilient properties for relieving any mechanical stress due to difference in expansion from temperature changes to which the members being interfaced are subjected.

Still another important object is to provide such an interface member that is constructed of commonly available low cost material.

Other objects, advantages and novel features of the invention will become apparent from the following detailed description of the invention when considered in conjunction with the accompanying drawings.

DESCRIPTION OF THE PREFERRED EMBODIMENT

Figure 1:
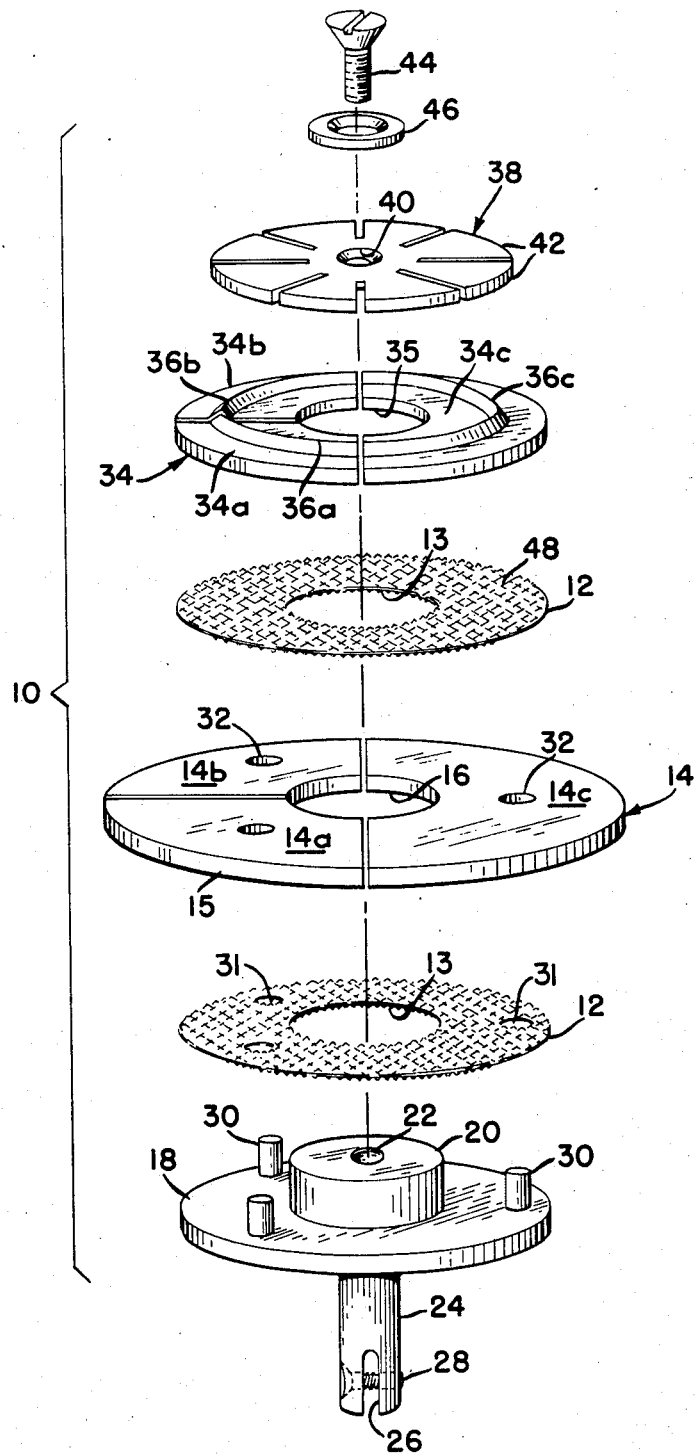
FIG. 1 is a top exploded view of a circular optical filter and its supporting holder.
Figure 2:
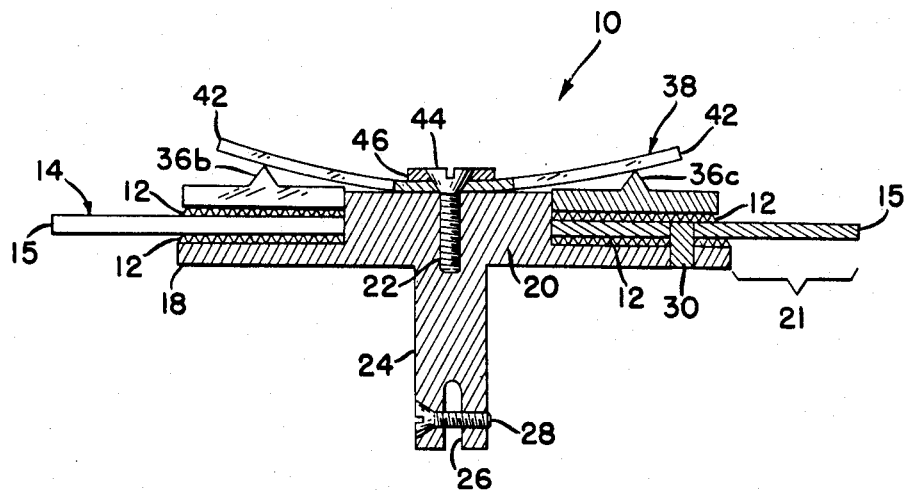
FIG. 2 is a cross-sectional elevation view of the assembled filter holder.
Figure 3:
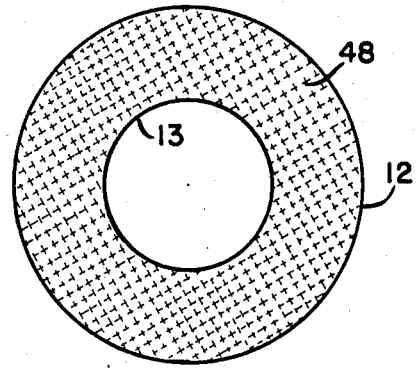
FIG. 3 is a top view of one of the novel aluminum foil interface members removed from its supporting structure.

Referring to drawings where like reference numerals refer to similar parts throughout the figures, there is shown in FIGS. 1 and 2 an optical radiation filter holder 10, used in a spectral dewar apparatus, which is one application in which the novel interface members 12 can be employed. Two interface members 12 are illustrated each having a central opening 13. The novel features of interface members 12 will be later described.

An interference filter 14 is deposited or otherwise applied on the surface of a germanium substrate 15 having a circular design and a central opening 16, the fabricated filter being in the order of 3 inches in diameter, and 0.085 inches in thickness. Germanium has adequate strength and high thermal conductivity as compared to Irtran 6 or other suitable substrate materials. As best shown in FIG. 1, the illustrated filter is fabricated into three annular segments 14a, 14b and 14c, i.e., 180° and 90° segments to provide a variable signal radiation over the wavelength range from 6 to 24 μm.

Filter 14 is rotatably supported via a lower interface members 12 on a disk 18 made of aluminum or other heat conductive material having a raised central hub portion 20 snugly extending through interface member opening 13 and filter opening 16. Support disk 18 is smaller in diameter than filter 14 so that the latter extends beyond to provide an annular overhang 21 which is the active portion of the optical filter (see FIG. 2). Hub 20 is provided with a central tapped opening 22 for a purpose later to be described.

Support disk 18 in addition to providing a support for the central portion of the filter, functions as a thermal heat sink therefore in association with the cold cavity of the apparatus. Extending beneath support disk 18 is a central stub shaft 24 having an end clamping slot 26 and screw 28 for connection to the driving and heat sinking means, not shown. Support disk 18 has mounted three spaced aligning pins 30 adapted to loosely project through corresponding apertures 31 in lower interface member 12, and apertures 32 centrally located in each of the respective filter segments 14a to 14c. Pins 30 are preferably of a length no longer than the depth of the corresponding apertures to avoid the pins protruding beyond the upper surface of the substrate. Therefore, upper interface member 12 need not be provided openings to receive aligning pins 30.

Filter 14 is clamped to support disk 18 between upper and lower interface members 12 by a pressure equalizing disk 34 comprising annular segments 34a, 34b and 34c, each segment corresponding to and coextensive with annular filter segments 14a, 14b, and 14c. The assembly of equalizing disk segments have a common central opening 35 to receive hub 20. The upper surface of disk segments have raised, intermediately positioned, circular peaked ridges, namely 36a, 36b and 36c. Pressure equalizing disk segments are preferably made of aluminum.

An integral constant pressure spring plate 38 is provided with a central aperture 40 and is slotted radially partially inwardly from its outer periphery to form a plurality of resilient fingers 42. In the particular embodiment illustrated, eight fingers are provided, two fingers for each 90° segment of the equalizing disk and filter, and four fingers for the one 180° segments of the respective parts. As shown in FIG. 2 the undersurface of each finger 42 bears only against the apex of ridges 36 of the respective disk segments. The desired pressure is applied to the component segments of filter assembly 10 through pressure plate 38 by means of a screw 44 and washer 46, screw 44 freely projecting through pressure plate aperture 40 and the other central openings and threaded into hub opening 22.

Thus, the tightening of screw 44 into hub 20 causes the fingers to bow inwardly, as shown in FIG. 2, applying a uniform balanced, and equalized pressure on filter 14 through the respective segments and the interface members 12 on each side thereof, against the support disk 18.

The specific construction of interface members 12 form an important feature of this invention. Because the coefficient of thermal expansion of aluminum support disk 18 and pressure equalizing disk 36 is three times greater than the expansion of the germanium filter substrate 14, interface members 12 are positioned on both sides of the filter to relieve the mechanical stress arising from the difference in motion of these two materials during the cooling cycle. Interface members 12 must also maintain a non-varying thermal coupling allowing sufficiently short thermal response time.

To accomplish these objectives, the novel interface members 12 are constructed to thin metal foil, such as common houshold aluminum foil having a thickness of approximately .001 inch. On the surface of the foil is impressed a pattern 48, which may be waffle-like in configuration.

Figure 4:
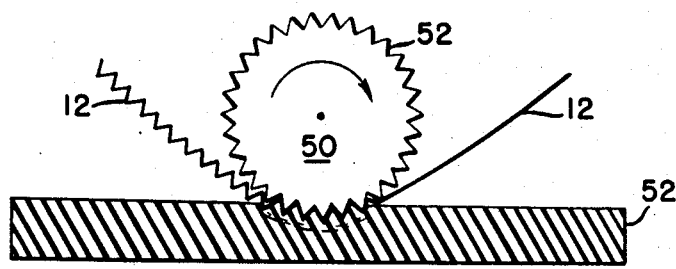
FIG. 4 is a diagrammatic view of one method for forming the indentations in the interface members.

One method of forming pattern 48 on the interface members which has proven satisfactory in the illustrated embodiment is shown in FIG. 4. A roller 50 is machined with a medium knurl 52 having a pitch of 12 per inch and a spiral angle of 29¼°, such a roller being commercially available. The foil interface member 12 is rolled between roller 50 and a soft backing, such as rubber sheet 52, the latter allowing a full depth pattern to be formed in the foil member. This process produces a pattern in the foil with a peak-to-valley dimension of 0.005 inches and an overall thickness of the patterned foil 12 of 0.007 inches. The peaks are spaced in a 0.020 inch by 0.080 inch pattern.

It should be noted that the above specified dimensions will vary depending on the characteristics of the foil, its thickness, hardness etc., and the mechanical requirements of the interfacing environment.

The waffle-like pattern on the interface members accomplishes the following results. The patterned peaks are initially crushed slightly by the mechanical force of spring plate 38 which conforms the interface members to any irregularities between the adjacent members and maintains a uniform contact therebetween. Secondly, the resiliency of the patterned foil members 12 allows some adjustment in the dimensional changes of the interfaced surfaces during temperature cycling, that is, by sliding maintains a constant contact area between the supporting surfaces and the interface members as they shift with respect to one another as a function of temperature. In addition, the indentation patterns on the interface members by their resilience provide a non-varying, thermally conductive path between the optical filter and its supporting members.

Obviously many modifications and variations of the present invention are possible in the light of the above teachings. It is therefore to be understood that within the scope of the appended claims the invention may be practiced otherwise than as specifically described.

I claim:
1. A holder for a fragile element subject to large temperature differential environment having a low tolerance to mechanical stress;
   a support means;
   clamping means for securing the fragile member to said support means;
   high heat conducting interface means positioned between the means and the member;
   said interface means being a thin metal sheet having compressive crushable and resilient properties capable of conforming to any irregularities in the surfaces of the adjacent means;
   whereby the fragile member can be maintained under a predetermined pressure with the interface means comforming to and applying a uniform pressure over the surface of the fragile member.

2. The holder of claim 1 wherein said interface means is metal foil.

3. The holder of claim 2 wherein said interface sheet is aluminum foil uniformly embossed with a waffle-like pattern over its entire surface.

4. The holder of claim 3 wherein said aluminum foil is in the order of 0.001 inch thick.

5. A holder for a spectral bandpass filter element comprising:
   a metal support;
   a fragile filter having a central portion mounted on said support;
   clamping means for applying a predetermined pressure on said central portion of the filter element;
   thermal interface means positioned between both the contacting surfaces of the support and clamping means;
   said interface means comprising a thin aluminum foil having formed on both surfaces a uniform pattern of impressions;
   whereby a minimum of pressure need be applied by said clamping means to conform the surface of said aluminum foil to the filter surfaces to obtain a uniform contact thereover and maximum heat transfer therebetween.

6. The holder of claim 5 wherein said clamping means comprises a circular pressure plate substantially conforming in shape to the filter, said pressure plate having an intermediate annular peaked ridge, and a plate having resilient fingers adapted to engage the ridge, and screw means to apply a uniform pressure to said plate and said filter through said plate.

7. The holder of claim 6 wherein the filter and pressure plate are provided with corresponding annular segments.

* * * * *